United States Patent
Fujiwara et al.

(10) Patent No.: US 10,155,285 B2
(45) Date of Patent: Dec. 18, 2018

(54) LASER WELDING METHOD AND LASER WELDING DEVICE

(71) Applicant: Panasonic Intellectual Property Management Co., Ltd., Osaka (JP)

(72) Inventors: Junji Fujiwara, Osaka (JP); Yasushi Mukai, Osaka (JP); Atsuhiro Kawamoto, Hyogo (JP); Tatsuyuki Nakagawa, Osaka (JP); Noriyuki Matsuoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 399 days.

(21) Appl. No.: 15/107,347

(22) PCT Filed: Dec. 25, 2014

(86) PCT No.: PCT/JP2014/006453
§ 371 (c)(1),
(2) Date: Jun. 22, 2016

(87) PCT Pub. No.: WO2015/104781
PCT Pub. Date: Jul. 16, 2015

(65) Prior Publication Data
US 2017/0001261 A1 Jan. 5, 2017

(30) Foreign Application Priority Data

Jan. 10, 2014 (JP) .................................. 2014-002891

(51) Int. Cl.
*B23K 26/322* (2014.01)
*B23K 26/00* (2014.01)
(Continued)

(52) U.S. Cl.
CPC ........ *B23K 26/322* (2013.01); *B23K 26/0006* (2013.01); *B23K 26/082* (2015.10);
(Continued)

(58) Field of Classification Search
CPC ........ B23K 26/32; B23K 26/24; B23K 26/00; B25J 11/00
(Continued)

(56) References Cited

U.S. PATENT DOCUMENTS 3,881,084 A * 4/1975 Baardsen ........... B23K 15/0093
219/121.64
4,873,415 A * 10/1989 Johnson ................. B23K 26/24
219/121.64
(Continued)

FOREIGN PATENT DOCUMENTS

JP 2005-334975 12/2005
JP 2005-537937 12/2005
(Continued)

OTHER PUBLICATIONS

Extended European Search Report dated Dec. 13, 2016 for the related European Patent Application No. 14878251.9.
(Continued)

*Primary Examiner* — Samuel M Heinrich
(74) *Attorney, Agent, or Firm* — Wenderoth, Lind & Ponack, L.L.P.

(57) ABSTRACT

A laser welding method of the present disclosure includes a first step, a second step, and a third step. In the first step, a first workpiece and a second workpiece are stacked on each other. Each of the first workpiece and the second workpiece has a surface coated with a first material and is made of a second material, which is different from the first material. In the second step, a first region in which the first workpiece and the second workpiece are stacked on each other is irradiated with a laser beam so that the laser beam penetrates both the first workpiece and the second workpiece. In the third step, a second region including the first region is irradiated with a laser beam in a spiral fashion.

12 Claims, 7 Drawing Sheets

(51) Int. Cl.

| | |
|---|---|
| *B23K 26/244* | (2014.01) |
| *B25J 11/00* | (2006.01) |
| *B23K 26/22* | (2006.01) |
| *B23K 26/082* | (2014.01) |
| *B23K 101/00* | (2006.01) |
| *B23K 101/34* | (2006.01) |
| *B23K 103/04* | (2006.01) |
| *B23K 103/08* | (2006.01) |

(52) U.S. Cl.
CPC ............ *B23K 26/22* (2013.01); *B23K 26/244* (2015.10); *B25J 11/005* (2013.01); *B23K 2101/006* (2018.08); *B23K 2101/34* (2018.08); *B23K 2103/04* (2018.08); *B23K 2103/08* (2018.08); *G05B 2219/45135* (2013.01)

(58) Field of Classification Search
USPC ............ 219/121.61–121.64, 121.78, 121.79
See application file for complete search history.

(56) References Cited

U.S. PATENT DOCUMENTS

| | | | |
|---|---|---|---|
| 5,603,853 A * | 2/1997 | Mombo-Caristan | ........................ B23K 15/006 219/121.14 |
| 2004/0173586 A1 * | 9/2004 | Musselman | ............ B23K 26/32 219/121.64 |
| 2004/0200813 A1 * | 10/2004 | Alips | ................. B23K 15/0046 219/121.63 |
| 2005/0263951 A1 | 12/2005 | Goth et al. | |
| 2006/0138101 A1 | 6/2006 | Zauner et al. | |
| 2007/0272665 A1 | 11/2007 | Becker et al. | |
| 2012/0211474 A1 | 8/2012 | Hayashimoto et al. | |
| 2013/0119025 A1 | 5/2013 | Lee et al. | |
| 2014/0048518 A1 | 2/2014 | Ogura et al. | |

FOREIGN PATENT DOCUMENTS

| | | |
|---|---|---|
| JP | 2007-520357 | 7/2007 |
| JP | 2007-237202 | 9/2007 |
| JP | 2008-126241 | 6/2008 |
| JP | 2009-148781 | 7/2009 |
| JP | 2010-046674 | 3/2010 |
| JP | 2011-173146 | 9/2011 |
| JP | 2012-115876 | 6/2012 |
| JP | 2012-170989 | 9/2012 |
| JP | 2012-228715 | 11/2012 |
| WO | 2012/146965 | 11/2012 |
| WO | 2013/167240 | 11/2013 |

OTHER PUBLICATIONS

International Search Report dated Mar. 31, 2015 in International (PCT) Application No. PCT/JP2014/006453.

* cited by examiner

LASER WELDING METHOD AND LASER WELDING DEVICE

This application is a U.S. national stage application of the PCT international application No. PCT/JP2014/006453.

TECHNICAL FIELD

The present disclosure relates to a laser welding method and a laser welding device that stack surface-treated members such as galvanized steel plates or the like on each other and then weld the stacked members by using a laser. More specifically, the present disclosure relates to laser welding that is effective in reducing formation of blowholes and pits.

BACKGROUND ART

Galvanized steel plates have superior resistance to rust and corrosion. For that reason, recently, galvanized steel plates have been used for automotive parts, architectural steel frames, and other members. Such galvanized steel plates are welded in accordance with their applications.

Figure 6A:
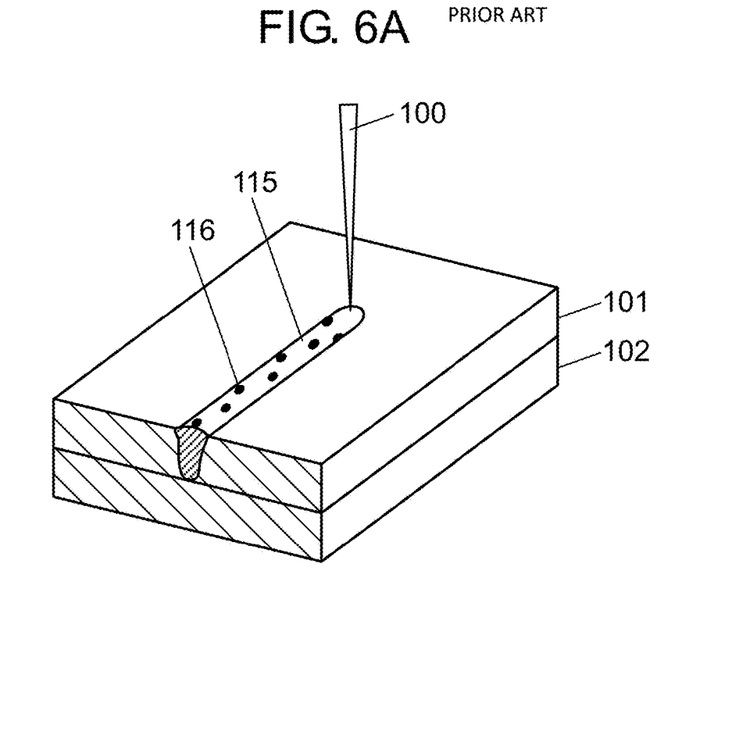
FIG. 6A is a perspective view to explain a conventional laser welding method.
Figure 6B:
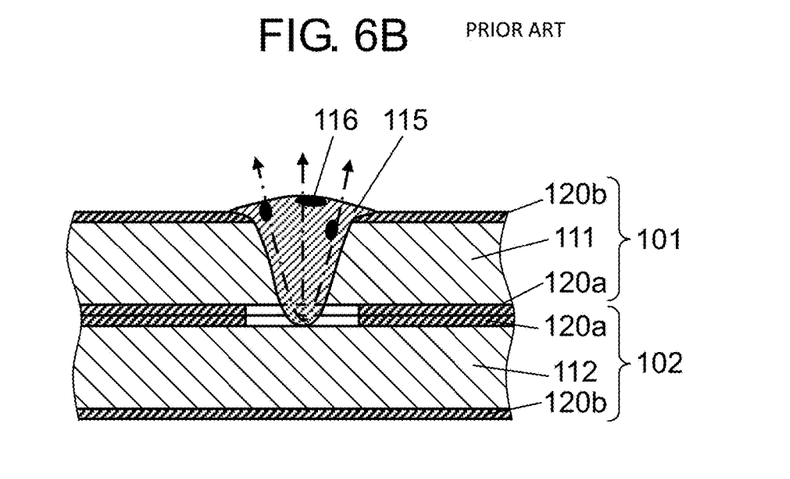
FIG. 6B is a cross section view to explain the conventional laser welding method.
Figure 7A:
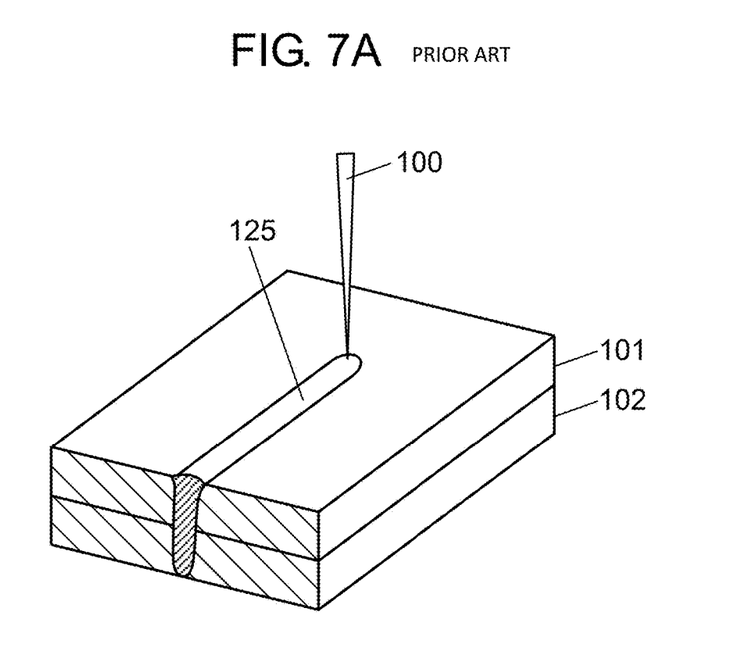
FIG. 7A is a perspective view to explain the conventional laser welding method.
Figure 7B:
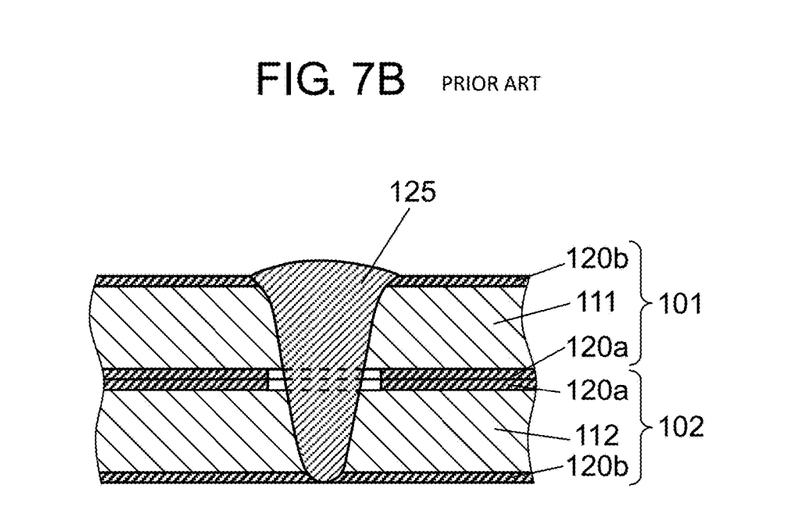
FIG. 7B is a cross section view to explain the conventional laser welding method.

A conventional laser welding method described in PTL 1 will be described with reference to FIG. 6A to FIG. 7B. FIG. 6A and FIG. 7A are perspective views to explain a conventional laser welding method. FIG. 6B is a cross section view related to FIG. 6A, which explains the conventional laser welding method; FIG. 7B is a cross section view related to FIG. 7A, which explains the conventional laser welding method.

As illustrated in FIG. 6A and FIG. 6B, anticorrosive steel plate 101 and anticorrosive steel plate 102 are stacked on each other. Anticorrosive steel plate 101 is steel plate 111 in which galvanized layer 120a is formed on a front surface and galvanized layer 120b is formed on a rear surface. Anticorrosive steel plate 102 is steel plate 112 in which galvanized layer 120a is formed on a front surface and galvanized layer 120b is formed on a rear surface. Anticorrosive steel plate 101 and anticorrosive steel plate 102 are stacked on each other in such a manner that their galvanized layers 120a are in contact with each other.

As illustrated in FIG. 6A and FIG. 6B, stacked anticorrosive steel plates 101, 102 are irradiated with laser beam 100 as a first laser irradiation. For this first laser irradiation, a heat input quantity of laser beam 100 is set such that laser beam 100 reaches galvanized layers 120a of anticorrosive steel plate 101 and anticorrosive steel plate 102 but does not penetrate anticorrosive steel plate 102.

As a result of the first laser irradiation, zinc contained in galvanized layer 120a is melted and released to an outside. Due to the evaporation of zinc, porosities 116 may be created in bead 115 formed by the first laser irradiation.

Subsequent to the first laser irradiation, as illustrated in FIG. 7A and FIG. 7B, anticorrosive steel plates 101, 102 are irradiated with laser beam 100 as a second laser irradiation. For the second laser irradiation, the heat input quantity of laser beam 100 is set such that laser beam 100 reliably reaches anticorrosive steel plate 102, finishing welding. Therefore, the energy of laser beam 100 for the second laser irradiation is set to be higher than the energy of laser beam 100 for the first laser irradiation. Further, the energy of laser beam 100 for the second laser irradiation is required to be set to be substantially as high as the energy of a laser beam used for typical laser welding. Moreover, laser beam 100 for the second laser irradiation may pass through the same path as laser beam 100 for the first laser irradiation.

When laser irradiation is performed twice as described above, steel plate 111 melted by the second laser irradiation fills in porosities 116 that have been created by the first laser irradiation. Thus, this two-time laser irradiation can appropriately form bead 125 having no porosities 116, because the first laser irradiation removes zinc from galvanized layers 120a and then the second laser irradiation fills porosities 116 without causing zinc to be evaporated.

CITATION LIST

Patent Literature

PTL 1: Unexamined Japanese Patent Publication No. 2008-126241

SUMMARY OF THE INVENTION

Problems of the above conventional laser welding method will be described below.

When the first laser irradiation in the conventional laser welding method is performed, it is difficult to control the energy of the laser beam such that the laser beam reaches galvanized layers 120a of anticorrosive steel plate 101 and anticorrosive steel plate 102, which are anticorrosive steel plates, without penetrating anticorrosive steel plate 102.

Because of a reduced energy of the laser beam for the first laser irradiation, an area irradiated with the laser beam and an area from which zinc is evaporated due to heat transfer may be limited. Therefore, the first laser irradiation may fail to sufficiently discharge a zinc vapor, and the second laser irradiation may further generate a zinc vapor due to heat transfer, in which case porosities might be created.

The present disclosure provides a laser welding method and a laser welding device that are capable of reducing formation of pores by sufficiently discharging a zinc vapor with first laser irradiation and by performing main welding with second laser irradiation.

A laser welding method of the present disclosure, which addresses the above problems, includes a first step, a second step, and a third step. In the first step, a first workpiece and a second workpiece are stacked on each other. Each of the first workpiece and the second workpiece has a surface coated with a first material and is made of a second material, which is different from the first material. In the second step, a first region in which the first workpiece and the second workpiece are stacked on each other is irradiated with a laser beam so that the laser beam penetrates both the first workpiece and the second workpiece. In the third step, a second region including the first region is irradiated with the laser beam in a spiral fashion.

A laser welding device of the present disclosure includes a laser oscillator, a laser head, a robot, and a control unit. The laser oscillator outputs a laser beam. The laser head irradiates a first workpiece and a second workpiece with the laser beam. Each of the first workpiece and the second workpiece has a surface coated with a first material and is made of a second material, which is different from the first material. The laser head is provided in the robot. The control unit controls an output of the laser oscillator, an operation of the laser head, and an operation of the robot. The laser head irradiates, with a laser beam, a first region in which the first workpiece and the second workpiece are stacked on each other so that the laser beam penetrates both the first workpiece and the second workpiece. The laser head irradiates a second region including the first region with the laser beam in a spiral fashion.

According to the present disclosure, as described above, first laser irradiation sufficiently discharges a zinc vapor, and then second laser irradiation performs main welding. This two-time laser irradiation successfully reduces formation of pores and an influence of the zinc vapor during the main welding. Therefore, it is possible to control formation of pores in the interior and surface of a weld bead.

DESCRIPTION OF EMBODIMENTS

Some exemplary embodiments of the present disclosure will be described below with reference to FIG. 1 to FIG. 5.

First Exemplary Embodiment

Figure 1:
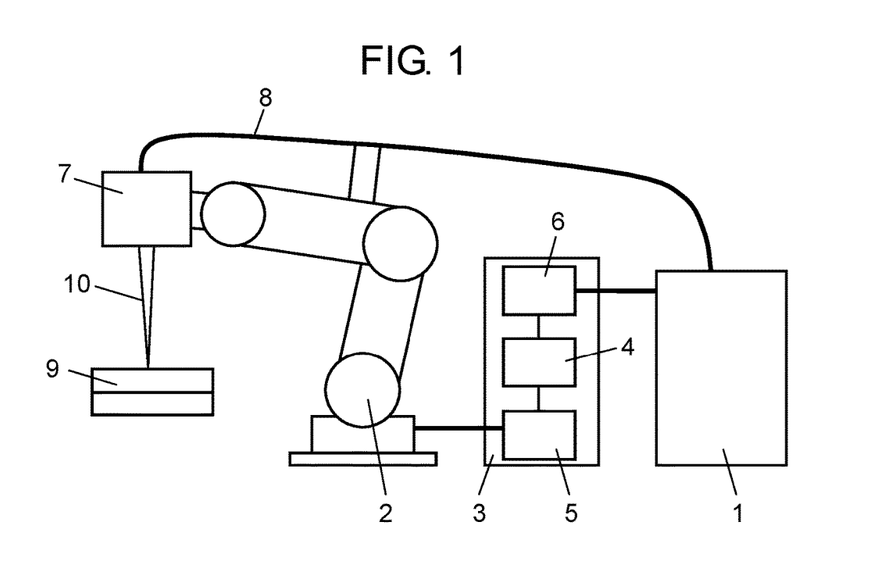
FIG. 1 illustrates a schematic configuration of a laser welding device in a first exemplary embodiment.
Figure 2A:
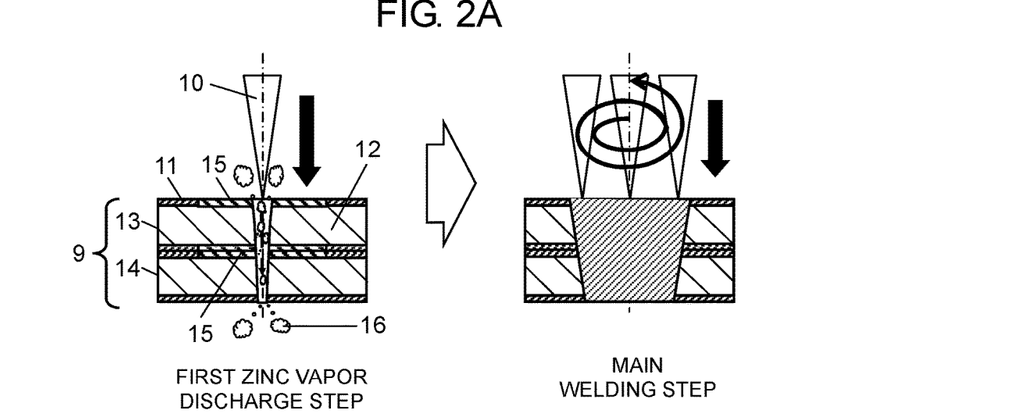
FIG. 2A illustrates steps of a laser welding method in the first exemplary embodiment.
Figure 2B:
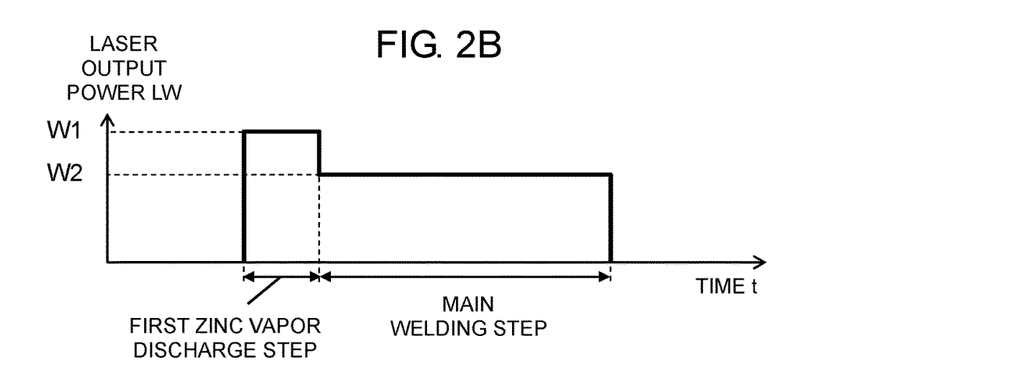
FIG. 2B is a graph indicating laser output power in the laser welding method in the first exemplary embodiment.
Figure 2C:
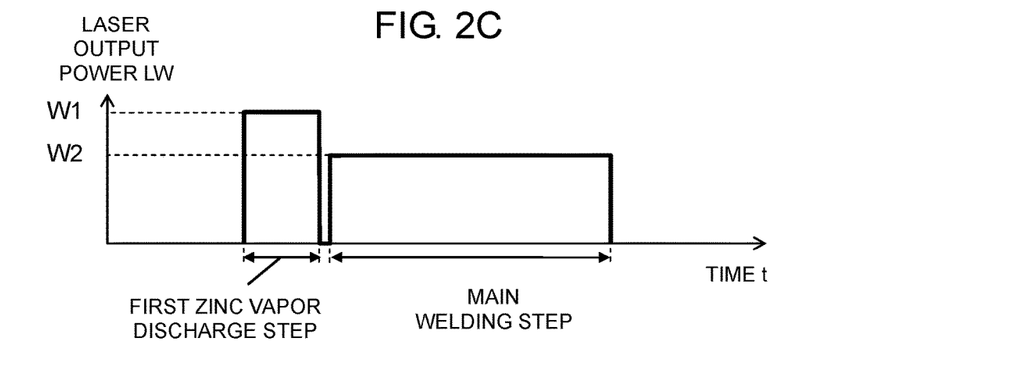
FIG. 2C is a graph indicating laser output power in another laser welding method in the first exemplary embodiment.

A first exemplary embodiment will be described with reference to FIG. 1 to FIG. 2C. FIG. 1 illustrates a schematic configuration of a laser welding device in this exemplary embodiment. FIG. 2A illustrates steps of a laser welding method in this exemplary embodiment. FIG. 2B is a graph indicating laser output power in the laser welding method in this exemplary embodiment. FIG. 2C is a graph indicating laser output power in another laser welding method in this exemplary embodiment. In FIG. 2B and FIG. 2C, the horizontal axis represents a time t and the vertical axis represents laser output power LW.

As illustrated in FIG. 1, a laser welding device in this exemplary embodiment includes laser oscillator 1, robot 2, controller 3 (control unit), laser irradiation head 7 (laser head), and optical fiber 8.

Laser oscillator 1 is connected to controller 3 and to a first end of optical fiber 8. Laser oscillator 1 outputs a laser beam, and then the laser beam enters optical fiber 8. Robot 2 is connected to controller 3 and is provided with laser irradiation head 7 at its end. Controller 3 has welding condition setting section 4, operation control section 5, and laser output control section 6. Welding condition setting section 4 sets conditions for laser welding (an output of the laser beam and a movement of the laser beam, such as a welding speed and a path of the laser beam). Operation control section 5 controls an operation of robot 2 and an operation of laser irradiation head 7, based on an instruction from welding condition setting section 4 or an operation program taught in advance. Laser output control section 6 controls an output of a laser beam oscillated by laser oscillator 1, based on an instruction from welding condition setting section 4.

Laser irradiation head 7 is connected to a second end of optical fiber 8 and irradiates workpiece 9 (first workpiece and second workpiece) with laser beam 10. Laser irradiation head 7 includes a galvanometer mirror, a collimator lens, and a condenser lens, as exemplary components. Optical fiber 8 is connected between laser oscillator 1 and laser irradiation head 7. The laser beam output from laser oscillator 1 is transmitted to laser irradiation head 7 through optical fiber 8. Workpiece 9 includes two stacked, galvanized steel plates. Each of the galvanized steel plates has a surface coated with zinc (first material) and is made of iron (second material). When laser oscillator 1 oscillates laser beam 10, laser beam 10 travels in optical fiber 8 and is collected by laser irradiation head 7. As a result, workpiece 9 is irradiated with laser beam 10.

Next, a laser welding method in this exemplary embodiment will be described with reference to FIG. 2A and FIG. 2B.

First, a first one of two galvanized steel plates and a second one are stacked on each other in accordance with a relation of a welding location (first step). The two galvanized steel plates may be stacked by a transfer device, which is independent of the above laser welding device, or by an operator. In this way, workpiece 9 in which the two galvanized steel plates, each of which has a surface coated with zinc 11 (first material) and is made of iron 12 (second material), are stacked on each other is fabricated. It should be noted that the workpiece to be welded with laser by a laser welding method and a laser welding device of the present disclosure is not limited to galvanized steel plates. Any other workpieces in which the boiling point of a material for the surfaces (zinc contained in the galvanized steel plates) is lower than the melting point of a main material (iron contained in the galvanized steel plates) may be used. In addition, a method of forming a material on the surfaces is not limited to plating; alternatively, any other methods, including application and bonding, may be used.

Then, as illustrated in the left part of FIG. 2A, laser irradiation head 7 outputs laser beam 10 to the two stacked, galvanized steel plates, so that the center or its adjacent portion of the regions of galvanized steel plates to be bonded to each other by laser welding is irradiated (second step). Herein, the first galvanized steel plate to be irradiated with laser beam 10 is referred to as upper plate 13, whereas the second galvanized steel plate is referred to as lower plate 14. The output of laser beam 10 is set to output power W1 at which laser beam 10 can penetrate both upper plate 13 and lower plate 14 at a predetermined location, as illustrated in the left part of FIG. 2B. Then, laser irradiation head 7 irradiates workpiece 9 with laser beam 10. While laser irradiation head 7 is irradiating workpiece 9 with laser beam 10 at output power W1, neither robot 2 nor laser irradiation head 7 operates. Therefore, a preset region (first region) of workpiece 9 is irradiated with laser beam 10 in spot form. This step is referred to as the first zinc vapor discharge step.

The first zinc vapor discharge step will be described more concretely.

Output power W1 of laser beam 10 in the first zinc vapor discharge step depends on the thicknesses of upper plate 13 and lower plate 14. More specifically, as the thicknesses of upper plate 13 and lower plate 14 increase, it is necessary to increase output power W1 of laser beam 10 in order to cause laser beam 10 to penetrate workpiece 9. In the region irradiated with laser beam 10, zinc contained in upper plate 13 and in lower plate 14 is evaporated and iron is melted. As a result, heat transfer section 15 is created within a surrounding area of the region irradiated with laser beam 10. Then, zinc contained in upper plate 13 and in lower plate 14 is further evaporated or iron is melted. The reason is that the boiling point of zinc (907° C.) is lower than the melting point of iron (1538° C.).

By causing laser beam 10 to penetrate workpiece 9, as described above, the contact surfaces of upper plate 13 and lower plate 14 are exposed through the through-hole, as shown in FIG. 2A. This can create discharge paths in both upper plate 13 and lower plate 14. Through these discharge paths, zinc vapor 16 generated in the contact surfaces of upper plate 13 and lower plate 14 is discharged. The word "through-hole" described in the present disclosure refers to a hole that is not empty and filled with melted metal (iron contained in the galvanized steel plates). Zinc vapor 16 passes through this melted metal and is discharged.

Subsequent to the second step, as illustrated in the right part of FIG. 2A, laser irradiation head 7 irradiates, with laser beam 10, a region (second region) of workpiece 9 to be boned by laser welding (third step). This irradiated region is centered on the site of workpiece 9 which has been irradiated with laser beam 10 in the first zinc vapor discharge step. The output of laser beam 10 is set to output power W2 at which laser beam 10 can penetrate both upper plate 13 and lower plate 14 at a predetermined location, as illustrated in the right part of FIG. 2B. Then, laser irradiation head 7 irradiates the preset region of workpiece 9 with laser beam 10. While laser irradiation head 7 is irradiating workpiece 9 with laser beam 10 at output power W2, both of robot 2 and laser irradiation head 7 operate. More specifically, robot 2 and laser irradiation head 7 operate so as to move laser beam 10 within the laser-welded region in a spiral fashion. As a result, upper plate 13 is bonded to lower plate 14 by laser welding. This step is referred to as the main welding step.

The main welding step will be described more concretely.

Output power W2 of laser beam 10 in the main welding step is preferably lower than output power W1 of laser beam 10 in the first zinc vapor discharge step. Since workpiece 9 has been irradiated with laser beam 10 at high output power in the first zinc vapor discharge step, heat transfer section 15 has been created across a wide area, and thus zinc vapor 16 has already been generated and discharged from a wide area in the contact surfaces of upper plate 13 and lower plate 14. Therefore, when in the main welding step, an area of workpiece 9 which is wider than the area irradiated in the first zinc vapor discharge step may be irradiated with laser beam 10 at output power higher than output power W1, zinc vapor 16 may be generated in a further wider area. In this case, blowholes and pits might be created. Thus, to avoid such problems in the main welding step, laser irradiation head 7 preferably irradiates workpiece 9 with laser beam 10 at output power W2 lower than output power W1, suppressing zinc vapor 16 from being further created.

In the main welding step, as illustrated in FIG. 2A, robot 2 moves laser beam 10 outwardly from the site of workpiece 9 which has been irradiated with laser beam 10 in the first zinc vapor discharge step (or from substantially the center of the region bonded by the laser welding). However, a movement of laser beam 10 is not limited to this method. Alternatively, robot 2 may move laser beam 10 inwardly from the outer circumference of the region bonded by the laser welding (from the site of workpiece 9 which has been irradiated with laser beam 10 in the first zinc vapor discharge step). Moreover, robot 2 may move laser beam 10 so as to reciprocate between the center of the region bonded by the laser welding and the outer circumference of the bonded region.

As illustrated in FIG. 2B, controller 3 causes laser oscillator 1 to continue to output laser beam 10 between the first zinc vapor discharge step and the main welding step by switching the outputs of laser beam 10 without stopping outputting laser beam 10. This can shorten a laser welding time. Alternatively, as illustrated in FIG. 2C, controller 3 may stop laser oscillator 1 from outputting laser beam 10 between the first zinc vapor discharge step and the main welding step. In this case, controller 3 can change or select a direction of the spiral movement of laser beam 10, and can arbitrarily set an initial location to be irradiated with laser beam 10 in the main welding step. More specifically, in the main welding step, controller 3 may set an initial location in workpiece 9 to be irradiated with laser beam 10 to a location displaced outwardly by 1 mm from the center of the region bonded by the laser welding and may move laser beam 10 toward the outer circumference of the bonded region. Alternatively, in the main welding step, controller 3 may set an initial location in workpiece 9 to be irradiated with laser beam 10 to the outer circumference of the region bonded by laser welding and may finish moving laser beam 10 at a location displaced by 1 mm outwardly from the center of the bonded region.

Second Exemplary Embodiment

Figure 3A:
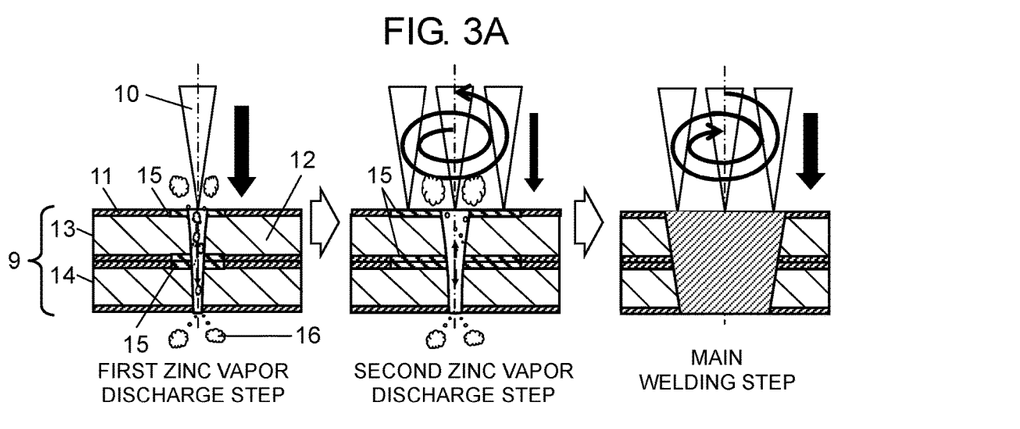
FIG. 3A illustrates steps of a laser welding method in a second exemplary embodiment.
Figure 3B:
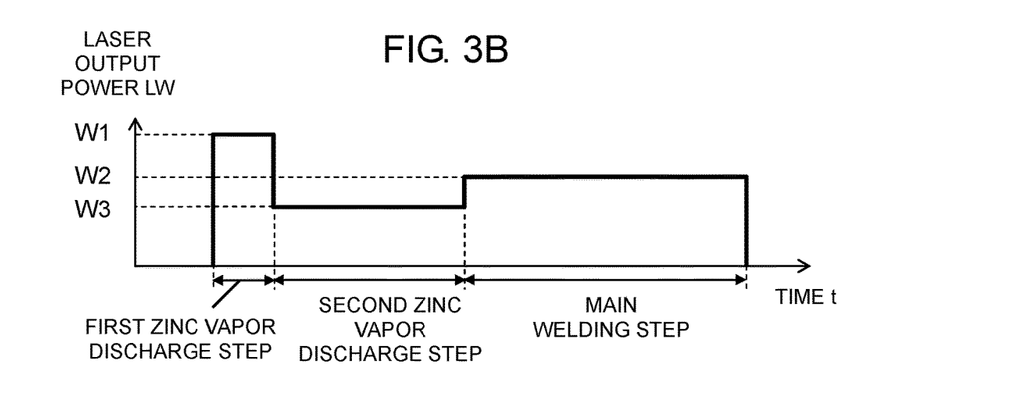
FIG. 3B is a graph indicating laser output power in the laser welding method in the second exemplary embodiment.
Figure 3C:
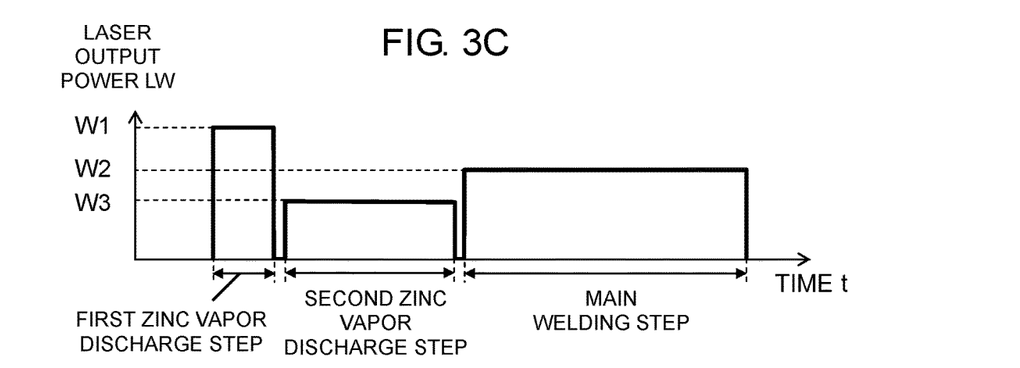
FIG. 3C is a graph indicating laser output power in another laser welding method in the second exemplary embodiment.
Figure 4:
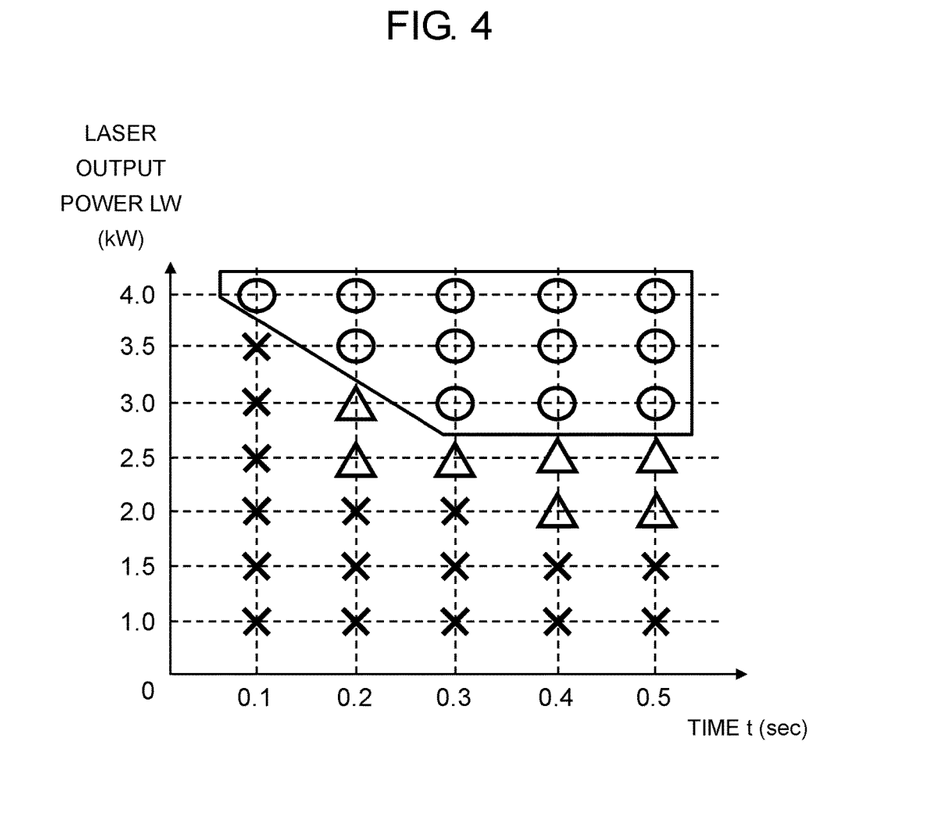
FIG. 4 illustrates an effect produced by a relationship between laser output power and a laser irradiation time in a first zinc vapor discharge step in the second exemplary embodiment.
Figure 5:
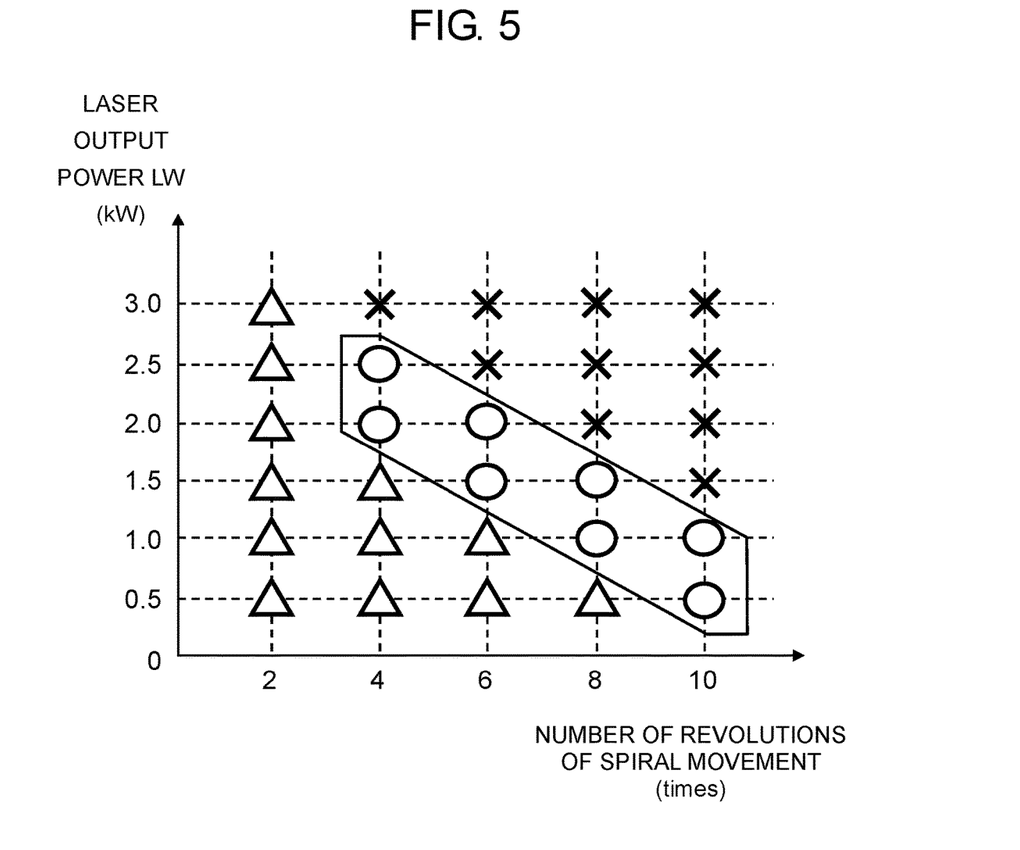
FIG. 5 illustrates an effect produced by a relationship between laser output power and a number of revolutions of a spiral movement in a second zinc vapor discharge step in the second exemplary embodiment.

A second exemplary embodiment will be described with reference to FIG. 3A to FIG. 5. FIG. 3A illustrates steps of a laser welding method in this exemplary embodiment. FIG. 3B is a graph indicating laser output power in the laser welding method in this exemplary embodiment. FIG. 3C is a graph indicating laser output power in another laser welding method in this exemplary embodiment. FIG. 4 illustrates an effect produced by a relationship between laser output power and a laser irradiation time in a first zinc vapor discharge step. FIG. 5 illustrates an effect produced by a relationship between laser output power and a number of revolutions of a spiral movement in a second zinc vapor discharge step.

A laser welding device in this exemplary embodiment will not be described, because this laser welding device is identical to the laser welding device in the first exemplary embodiment.

A laser welding method in this exemplary embodiment will be described with reference to FIG. 3A to FIG. 3C. The laser welding method in this exemplary embodiment further includes a second zinc vapor discharge step to be performed between the first zinc vapor discharge step and the main welding step in the first exemplary embodiment. The first zinc vapor discharge step and the main welding step, which are identical to those in the first exemplary embodiment, will not be described.

As illustrated in the middle part of FIG. 3A, a region (second region) of workpiece 9 to be bonded by laser welding is irradiated with laser beam 10 (fourth step). This region is centered on the site of workpiece 9 which has been irradiated with laser beam 10 in the first zinc vapor discharge step. In this case, as illustrated in the middle part of FIG. 3B, the output of laser beam 10 is set to output power W3 at which zinc can be evaporated from the contact surfaces of upper plate 13 and lower plate 14. Laser irradiation head 7 irradiates a preset region of workpiece 9 with laser beam 10 at output power W3. While laser irradiation head 7 is irradiating workpiece 9 with laser beam 10 at the output power W3, both of robot 2 and laser irradiation head 7 operate to move laser beam 10 within the laser-welded region in a spiral fashion. As a result, zinc is evaporated from the contact surfaces of upper plate 13 and lower plate 14, whereby zinc vapor 16 is discharged from a through-hole that has been created in the first zinc vapor discharge step. This step is referred to as the second zinc vapor discharge step.

The second zinc vapor discharge step will be described more concretely.

Output power W3 of laser beam 10 in the second zinc vapor discharge step is preferably set to be smaller than both output power W1 of laser beam 10 in the first zinc vapor discharge step and output power W2 of laser beam 10 in the main welding step. The second zinc vapor discharge step is a step of evaporating zinc in the contact surfaces of upper plate 13 and lower plate 14 and discharging the evaporated zinc through the through-hole that has been created in the first zinc vapor discharge step. Therefore, the second zinc vapor discharge step does not have to melt iron with laser beam 10 and has only to evaporate zinc in the contact surfaces of upper plate 13 and lower plate 14 by heating upper plate 13 with laser beam 10. By heating upper plate 13, the heat is transferred from upper plate 13 to an entire laser-welded region, so that zinc in the contact surfaces of upper plate 13 and lower plate 14 is evaporated. Zinc vapor 16 thus generated is discharged to the outside of workpiece 9 through the through-hole.

In the second zinc vapor discharge step, as illustrated in FIG. 3A, robot 2 moves laser beam 10 from the site of workpiece 9 which has been irradiated with laser beam 10 in the first zinc vapor discharge step (from substantially the center of the region bonded by the laser welding) to the outside. However, a movement of laser beam 10 is not limited to this method. Alternatively, controller 3 may move laser beam 10 from the outer circumference of the region bonded by the laser welding to the inside (the site irradiated with laser beam 10 in the first zinc vapor discharge step). Alternatively, controller 3 may move laser beam 10 so as to reciprocate between the center of the region bonded by the laser welding and the outer circumference of this region.

As illustrated in FIG. 3B, controller 3 causes laser oscillator 1 to continue to output laser beam 10 between the first zinc vapor discharge step and the second zinc vapor discharge step by switching the outputs of laser beam 10 without stopping outputting laser beam 10. This can shorten a laser welding time. Alternatively, as illustrated in FIG. 3C, controller 3 may stop laser oscillator 1 from outputting laser beam 10 between the first zinc vapor discharge step and the second zinc vapor discharge step. In this case, in the second zinc vapor discharge step, controller 3 can change or select a direction of the spiral movement of laser beam 10 and can arbitrarily set an initial location to be irradiated with laser beam 10. More specifically, in the second zinc vapor discharge step, controller 3 may set an initial location in workpiece 9 to be irradiated with laser beam 10 to a location displaced outwardly by 1 mm from the center of the region bonded by the laser welding and may move laser beam 10 toward the outer circumference of the bonded region. Alternatively, in the second zinc vapor discharge step, controller 3 may set an initial location in workpiece 9 to be irradiated with laser beam 10 to the outer circumference of the region bonded by laser welding and may finish moving laser beam 10 at a location displaced by 1 mm outwardly from the center of the bonded region.

As illustrated in FIG. 3B, controller 3 causes laser oscillator 1 to continue to output laser beam 10 between the second zinc vapor discharge step and the main welding step by switching the outputs of laser beam 10 without stopping outputting laser beam 10. This can also shorten a laser welding time. Alternatively, as illustrated in FIG. 3C, controller 3 may stop laser oscillator 1 from outputting laser beam 10 between the first zinc vapor discharge step and the second zinc vapor discharge step. This can provide a high degree of flexibility in selecting an initial location in workpiece 9 to be irradiated with laser beam 10, for example.

In the laser welding method in this exemplary embodiment, the switching between two steps is done twice. More specifically, a first step of switching from the first zinc vapor discharge step to the second zinc vapor discharge step and a second step of switching from the second zinc vapor discharge step to the main welding step are performed. The laser welding method in this exemplary embodiment may employ various switching manners. As an example, laser oscillator 1 may continue to output a laser beam in both the first and second switching steps. As another example, laser oscillator 1 may stop outputting a laser beam in both the first and second switching steps. As still another example, laser oscillator 1 may continue to output a laser beam in one of the first and second switching steps and may stop outputting a laser beam in the other of the first and second switching steps.

An effect of the second zinc vapor discharge step will be described below. The second zinc vapor discharge step may be optional. For example, when each of upper plate 13 and lower plate 14 has a relatively small thickness, such as a thickness of 0.8 mm to 1.0 mm, the first zinc vapor discharge step can discharge zinc vapor 16 to some extent. The reason is as follows. In the first zinc vapor discharge step, output power W1 of laser beam 10 is set to a high value in order to cause laser beam 10 to penetrate workpiece 9. Because of a small thickness of workpiece 9, the heat is transferred from a site of workpiece 9 adjoining the through-hole to a site of workpiece 9 adjoining the outer circumference of the region bonded by the laser welding, so that zinc vapor 16 is sufficiently generated.

When each of upper plate 13 and lower plate 14 has a thickness of 1.6 mm or greater, there are cases where the heat is not transferred from a site of workpiece 9 adjoining the through-hole to a site of workpiece 9 adjoining the outer circumference of the region bonded by the laser welding. In such cases, zinc vapor 16 may be insufficiently generated. Thus, the second zinc vapor discharge step is effective in discharging zinc vapor 16, especially when heat is not sufficiently transferred in workpiece 9.

Next, a description will be given below of how to drive and control the laser welding device that performs the laser welding method in the first exemplary embodiment or the second exemplary embodiment.

Laser output control section 6 sets an output of laser beam 10 in each of the first zinc vapor discharge step, the second zinc vapor discharge step, and the main welding step by controlling laser oscillator 1 in accordance with an instruction (output control command) from welding condition setting section 4. Laser output control section 6 incorporates a program including patterns related to different output values of laser beam 10. This program is used to switch laser outputs. When laser oscillator 1 outputs laser beam 10, laser beam 10 is transmitted to laser irradiation head 7 through optical fiber 8. A program incorporated in laser output control section 6 is derived from experimental data regarding laser welding related to various thicknesses.

Operation control section 5 moves laser beam 10 in the first zinc vapor discharge step, second zinc vapor discharge step, and main welding step by controlling both robot 2 and laser irradiation head 7 in accordance with an instruction (position control command) from welding condition setting section 4.

When the laser welding methods in the first exemplary embodiment and in the second exemplary embodiment are performed, controller 3 controls an output of laser oscillator 1, a location of robot 2, and a location of laser irradiation head 7 in synchronization with one another. In this way, welding condition setting section 4, operation control section 5, and laser output control section 6, which constitute controller 3, adjust an energy density of laser beam 10.

Next, a description will be given below of exemplary welding conditions under which the laser welding device in the above exemplary embodiments performs the laser welding methods in the exemplary embodiments.

FIG. 4 illustrates an effect produced by a relationship between a laser irradiation time and laser output power in the first zinc vapor discharge step. In the experimental evaluation illustrated in FIG. 4, a coating weight is 45 g/m$^2$, and two galvanized steel plates each having a thickness of 1.6 mm are stacked on each other.

In FIG. 4, the horizontal axis represents a laser irradiation time t (second) and the vertical axis represents laser output power LW (kW). Performance levels of through-holes formed are expressed by the marks "circle," "triangle," and "cross." After the first zinc vapor discharge step had been performed, the through-holes are visually checked. The mark "circle" indicates that a through-hole is sufficiently formed; the mark "triangle" indicates that a through-hole is insufficiently formed; and the mark "cross" indicates that no through-hole is formed.

The experimental evaluation result reveals the following facts. The laser output needs to be set to 3.0 kW or higher in order to cause laser beam 10 to penetrate workpiece 9. The laser irradiation time needs to be increased as the laser output power decreases. When the laser output or the laser irradiation time decreases, the through-hole is insufficiently formed or not formed.

FIG. 5 illustrates an effect produced by the relationship between laser output power and a number of revolutions of a spiral movement in the second zinc vapor discharge step. In the experimental evaluation illustrated in FIG. 5, a coating weight is 45 g/m$^2$, and two galvanized steel plates each having a thickness of 1.6 mm are stacked on each other, similarly to the experimental evaluation for the first zinc vapor discharge step. The speed of a spiral movement (welding) of laser beam 10 is 10 m/min. After a predetermined amount of zinc had been discharged from workpiece 9 in the first zinc vapor discharge step, the second zinc vapor discharge step is performed.

In FIG. 5, the horizontal axis represents a number of revolutions (times) of the spiral movement, and the vertical axis represents the laser output power LW (kW). A result of discharge of zinc vapor 16 is expressed by the marks "circle," "triangle," and "cross." After the second zinc vapor discharge step had been performed, through-holes are visually checked. The mark "circle" indicates that zinc vapor 16 is sufficiently discharged; the mark "triangle" indicates that the heating effect is insufficient and thus zinc vapor 16 is insufficiently discharged; and the mark "cross" indicates that overheating generates an excessive amount of zinc vapor 16 and leaves pores.

The experimental evaluation result reveals that it is necessary to balance the laser output and a number of revolutions of the spiral movement in order to optimize discharging of zinc vapor 16. More specifically, when the laser output increases, it is necessary to decrease the number of revolutions of a spiral movement. When the laser output decreases, it is necessary to increase the number of revolutions of the spiral movement. As the number of revolutions of the spiral movement is larger, a route along which workpiece 9 is irradiated with laser beam 10 is longer, that is, an irradiation time of laser beam 10 is longer, because laser beam 10 moves at a constant speed (10 m/min). Both the laser output and the number of revolutions of the spiral movement are preferably set such that zinc vapor 16 is discharged readily. When the laser output increases, the number of revolutions of the spiral movement may be decreased to shorten the welding time.

In the first exemplary embodiment and the second exemplary embodiment described above, laser welding is applied to two galvanized steel plates stacked on each other. However, laser welding is also applicable to three or more galvanized steel plates stacked on top of one another.

In the first exemplary embodiment and the second exemplary embodiment described above, galvanized steel plates are formed by coating an iron material with zinc. However, any other steel plates whose boiling point is lower than the melting point of a metal formed on their surfaces may be used. Example of such steel plates include steel plates coated with an alloy of aluminum, zinc, and silicon (e.g., Galvalume steel plate) and steel plates coated with zinc to which aluminum and magnesium are added (e.g., Galtite).

INDUSTRIAL APPLICABILITY

According to the present disclosure, as described above, the laser welding method and the laser welding device for use in welding galvanized steel plates or other surface-treated steel plates are industrially effective in reducing formation of pores in the interior and surface of a weld bead.

The invention claimed is:

1. A laser welding method comprising:
 a first step of stacking a first workpiece and a second workpiece each other, each of the first workpiece and the second workpiece having a surface coated with a first material, each of the first workpiece and the second workpiece being made of a second material, the second material differing from the first material;
 a second step of irradiating a first region with a laser beam so that the laser beam penetrates both the first workpiece and the second workpiece, the first workpiece and the second workpiece being stacked on each other within the first region; and
 a third step of irradiating a second region with a laser beam in a spiral fashion, the second region including the first region.

2. The laser welding method according to claim 1, wherein
 the second step and the third step are sequentially performed without stopping of an output of the laser beam.

3. The laser welding method according to claim 1, wherein
an output of the laser beam is temporarily stopped between the second step and the third step.

4. The laser welding method according to claim 1, further comprising a fourth step of irradiating a third region with a laser beam in a spiral fashion, the third region including the first region, the fourth step being performed between the second step and the third step.

5. The laser welding method according to claim 4, wherein
the second step and the fourth step are sequentially performed without stopping of an output of the laser beam.

6. The laser welding method according to claim 4, wherein
the fourth step and the third step are sequentially performed without stopping of an output of the laser beam.

7. The laser welding method according to claim 4, wherein
an output of the laser beam is temporarily stopped between the second step and the fourth step.

8. The laser welding method according to claim 4, wherein
an output of the laser beam is temporarily stopped between the fourth step and the third step.

9. The laser welding method according to claim 4, wherein
an output of the laser beam in the fourth step is lower than an output of the laser beam in the second step and is lower than an output of the laser beam in the third step.

10. The laser welding method according to claim 1, wherein
an output of the laser beam in the second step is higher than an output of the laser beam in the third step.

11. A laser welding device comprising:
a laser oscillator that outputs a laser beam;
a laser head through which a first workpiece and a second workpiece are irradiated with the laser beam, the first workpiece and the second workpiece being stacked on each other, each of the first workpiece and the second workpiece having a surface coated with a first material, each of the first workpiece and the second workpiece being made of a second material, the second material differing from the first material;
a robot equipped with the laser head; and
a control unit that controls an output of the laser oscillator, an operation of the laser head, and an operation of the robot,
wherein a first region in which the first workpiece and the second workpiece are stacked on each other is irradiated with a laser beam so that the laser beam penetrates both the first workpiece and the second workpiece, and
a second region including the first region is irradiated with a laser beam in a spiral fashion.

12. The laser welding device according to claim 11, wherein
the control unit includes:
a welding condition setting section that sets a welding condition;
a laser output control section that controls an output of the laser beam from the laser oscillator, based on the welding condition set by the welding condition setting section; and
an operation control section that controls the operation of the laser head and the operation of the robot, based on the welding condition set by the welding condition setting section.

* * * * *